United States Patent
Paick et al.

(10) Patent No.: US 11,926,392 B2
(45) Date of Patent: Mar. 12, 2024

(54) ELECTRIC BICYCLE SPEED CONTROL DEVICE AND METHOD

(71) Applicant: HL MANDO CORPORATION, Gyeonggi-do (KR)

(72) Inventors: In Ha Paick, Seoul (KR); Seungkyung Lee, Gyeonggi-do (KR); Young Sin Kim, Seoul (KR); Kyung Ho Hong, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 544 days.

(21) Appl. No.: 17/298,557

(22) PCT Filed: Jul. 29, 2020

(86) PCT No.: PCT/KR2020/009983
§ 371 (c)(1),
(2) Date: May 29, 2021

(87) PCT Pub. No.: WO2021/235595
PCT Pub. Date: Nov. 25, 2021

(65) Prior Publication Data
US 2022/0185427 A1    Jun. 16, 2022

(30) Foreign Application Priority Data
May 20, 2020   (KR) .................. 10-2020-0060161

(51) Int. Cl.
*B62M 6/50* (2010.01)

(52) U.S. Cl.
CPC .................................... *B62M 6/50* (2013.01)

(58) Field of Classification Search
CPC ............. B62M 6/40; B62M 6/45; B62M 6/50
See application file for complete search history.

(56) References Cited

U.S. PATENT DOCUMENTS

| | | |
|---|---|---|
| 2014/0080661 A1 | 3/2014 | Paick et al. |
| 2016/0040763 A1 | 2/2016 | Nichols et al. |

(Continued)

FOREIGN PATENT DOCUMENTS

| | | |
|---|---|---|
| CN | 104670408 | 6/2015 |
| CN | 106414152 | 2/2017 |

(Continued)

OTHER PUBLICATIONS

Office Action dated Aug. 17, 2022 for Chinese Patent Application No. 202080006531.5 and its English Translation from Global Dossier.

(Continued)

*Primary Examiner* — Kevin Hurley
(74) *Attorney, Agent, or Firm* — Ladas & Parry, LLP

(57) ABSTRACT

The present invention relates to electric bicycle speed control device and method. According to the present invention, a torque of a motor for driving a wheel is controlled so that a speed of a pedal driven by a user follows a speed of the wheel, and a torque of the pedal is also controlled by applying an assist level according to the torque of the motor. Therefore, even in an electric bicycle with a chain, it is possible to feel a feeling of the pedal like a bicycle with a chain, and it is possible to adjust the force applied to the pedal according to the assist level.

10 Claims, 7 Drawing Sheets

(56) References Cited

U.S. PATENT DOCUMENTS

| | | | | |
|---|---|---|---|---|
| 2016/0362021 A1* | 12/2016 | Sveje | ....................... | B60L 50/20 |
| 2017/0122244 A1* | 5/2017 | Dufford | ................ | B60W 10/26 |
| 2019/0358483 A1* | 11/2019 | Fuchs | ................... | B62M 19/00 |
| 2022/0135177 A1* | 5/2022 | Shahana | .................. | B62M 6/55 |
| | | | | 180/206.2 |
| 2023/0373590 A1* | 11/2023 | Paick | ....................... | B62M 6/50 |

FOREIGN PATENT DOCUMENTS

| | | | | |
|---|---|---|---|---|
| CN | 107472449 | | 12/2017 | |
| CN | 206841653 | | 1/2018 | |
| EP | 3 360 769 | | 8/2018 | |
| JP | 2017159867 A | * | 9/2017 | |
| KR | 10-2012-0051177 | | 5/2012 | |
| KR | 10-2014-0100156 | | 8/2014 | |
| KR | 10-2015-0144770 | | 12/2015 | |
| KR | 10-2017-0121837 | | 11/2017 | |
| KR | 10-1896022 | | 9/2018 | |
| WO | WO-2015128818 A1 | * | 9/2015 | .............. B60L 15/20 |

OTHER PUBLICATIONS

International Search Report for PCT/KR2020/009983 dated Feb. 2, 2021 and its English translation by Google Translate.

* cited by examiner

ELECTRIC BICYCLE SPEED CONTROL DEVICE AND METHOD

CROSS-REFERENCE TO RELATED APPLICATIONS

This application is the U.S. National Stage of International Patent Application No. PCT/KR2020/009983 filed on Jul. 29, 2020, which claims priority to and the benefit of Korean Patent Application No. 10-2020-0060161, filed with the Korean Intellectual Property Office on May 20, 2020, the disclosure of which is incorporated herein by reference in its entirety.

BACKGROUND

1. Field of the Invention

The present invention relates to a chainless electric bicycle, and more particularly, to speed control of an electric bicycle.

2. Discussion of Related Art

Recently, demand and interest in electric bicycles are increasing due to an increase in demand for short-distance transportation and environmental regulations. In Europe, as a category of E-CARGO has been created, various small vehicles having three to four wheels as well as vehicles having two wheels are being created. In Europe, any product that satisfies the Electrically Power Assisted Cycles (E-PAC) standard, which is an electric bicycle standard, may use the existing bicycle infrastructure, and in some regions, benefits such as subsidies are also available.

The E-PAC standard is a standard for a drive system that pulls an electric bicycle by applying force to a pedal, and the drive system includes a pedal. Therefore, the drive system of the electric bicycle appliance should meet the E-PAC standard. Most electric bicycle drive systems have a structure in which pedals and drive wheels are connected by chains. Two-wheel electric bicycles have the same structure in which wheels and pedals are connected by a chain like a conventional bicycle. However, in the E-CARGO including three to four wheels, when the chain is used in the drive system, the numbers of chains, gears, and the like increase, and thus, there is a problem that the drive system has a complex structure.

The inventors of the present invention have tried to solve problems of the drive system having a chain connection structure in the conventional electric bicycle. After much effort to complete an electric bicycle drive system in which the chain of the electric bicycle is eliminated, a driving force of the pedal is converted into electricity, and the electricity is transmitted to the wheels without the chain, the present invention has been completed.

SUMMARY OF THE INVENTION

The present invention is directed to providing a drive system having a simple structure that is applicable not only to E-CARGO having two wheels but also to E-CARGO having three to four wheels. In addition, the present invention is directed to providing a speed control method of an electric bicycle capable of providing a driving feeling similar to that of the existing electric bicycle with the chain while having the drive system and satisfying electric bicycle regulations or the like.

Meanwhile, other objects not specified of the present invention will be additionally considered within a range that can be easily deduced from the following detailed descriptions and effects thereof.

Technical Solution

One aspect of the present invention provides an electric bicycle speed control device including a speed sensor unit configured to measure a rotation speed of a wheel and a rotation speed of a generator driven by a pedal, a current sensor unit configured to measure driving currents of a motor for driving the wheel and the generator, a wheel speed control unit configured to generate a wheel torque command value using a wheel speed command value obtained by multiplying a rotation speed of the pedal measured by the speed sensor unit by a gear ratio and a wheel speed value measured by the speed sensor unit, a wheel torque control unit configured to generate a motor driving control current for driving the motor using the wheel torque command value and a driving current value of the motor measured by the current sensor unit, and a pedal torque control unit configured to generate a generator torque control current for controlling a torque of the generator using a value obtained by applying an assist level to the wheel torque command value and a generator driving current measurement value measured by the current sensor unit.

The wheel speed control unit may control the wheel torque command value so that the wheel speed value follows the wheel speed command value.

The wheel speed control unit may generate the wheel torque command value by a Proportional-Integral-Differential (PID) control method.

The wheel speed control unit may generate the wheel torque command value by adding a value obtained by multiplying a value obtained by subtracting a wheel speed from the wheel speed command value by a proportional coefficient, a value obtained by integrating a value obtained by subtracting the wheel speed from the wheel speed command value, and a value obtained by differentiating a value obtained by subtracting the wheel speed from the wheel speed command value and then multiplying the differential value by a wheel inertia value.

The wheel torque control unit may include a wheel torque calculation unit and a wheel current control unit, wherein the wheel torque calculation unit may calculate a motor current command for driving the motor using the wheel torque command, and the wheel current control unit may control a current for driving the motor using the motor current command and the measured motor driving current value.

The wheel torque control unit may control the motor driving current so that the motor driving current value follows the motor current command.

The pedal torque control unit may include a pedal torque calculation unit and a pedal current control unit, wherein the pedal torque calculation unit may calculate a generator current command using the value obtained by applying the assist level to the wheel torque command value, and the pedal current control unit may generate the generator torque control current using the generator current command and a measured generator current value.

The pedal torque control unit may control the generator torque control current so that the generator current value follows the generator current command.

Another aspect of the present invention provides an electric bicycle speed control method executed by a control unit including one or more processors, the method including receiving a rotation speed of a pedal and a wheel speed, generating a wheel torque command value using a wheel speed command value obtained by multiplying the rotation speed of the pedal by a gear ratio and a measured wheel speed value, measuring a driving current of a motor for driving a wheel and a driving current of a generator driven by the pedal, generating a motor driving control current for driving the motor using the wheel torque command value and the measured motor driving current value; and generating a generator torque control current for controlling a torque of the generator using a value obtained by applying an assist level to the wheel torque command value and a measured generator driving current value.

The generating of the wheel torque command value may include controlling the wheel torque command value so that a measured wheel speed value follows the wheel speed command value.

According to the present invention, it is possible to simplify a structure of a drive system by applying a chainless drive system. By adopting the chainless drive system, the drive system can be applicable to various small vehicles having three to four wheels as well as two wheels.

Meanwhile, even when there is an effect not explicitly described herein, effects described in the following specification and provisional effects thereof expected by technical features of the present invention are treated as described in the specification of the present invention.

The accompanying drawings are exemplified by reference for understanding a technical idea of the present invention, and the scope of the present invention is not limited thereto.

DETAILED DESCRIPTION OF EXEMPLARY EMBODIMENTS

Hereinafter, a configuration of the present invention guided by various embodiments of the present invention and effects resulting from the configuration will be described with reference to the drawings. In describing the present invention, when it is determined that matters obvious to those skilled in the art with respect to known functions related to the present invention may unnecessarily obscure subject matters of the present invention, detailed descriptions thereof will be omitted.

Terms such as "first" and "second" may be used to describe various elements, but the elements should not be limited by the above terms. The above terms may be used only for the purpose of distinguishing one element from other elements. For example, without departing from the scope of the present invention, a "first element" may be referred to as a "second element," and similarly, the "second element" may also referred to as the "first element." In addition, expressions in the singular include plural expressions unless clearly expressed differently in context. Unless otherwise defined, terms used in the embodiments of the present invention may be interpreted as meanings commonly known to those of ordinary skill in the art.

Hereinafter, a configuration of the present invention guided by various embodiments of the present invention and effects resulting from the configuration will be described with reference to the drawings.

Figure 1:
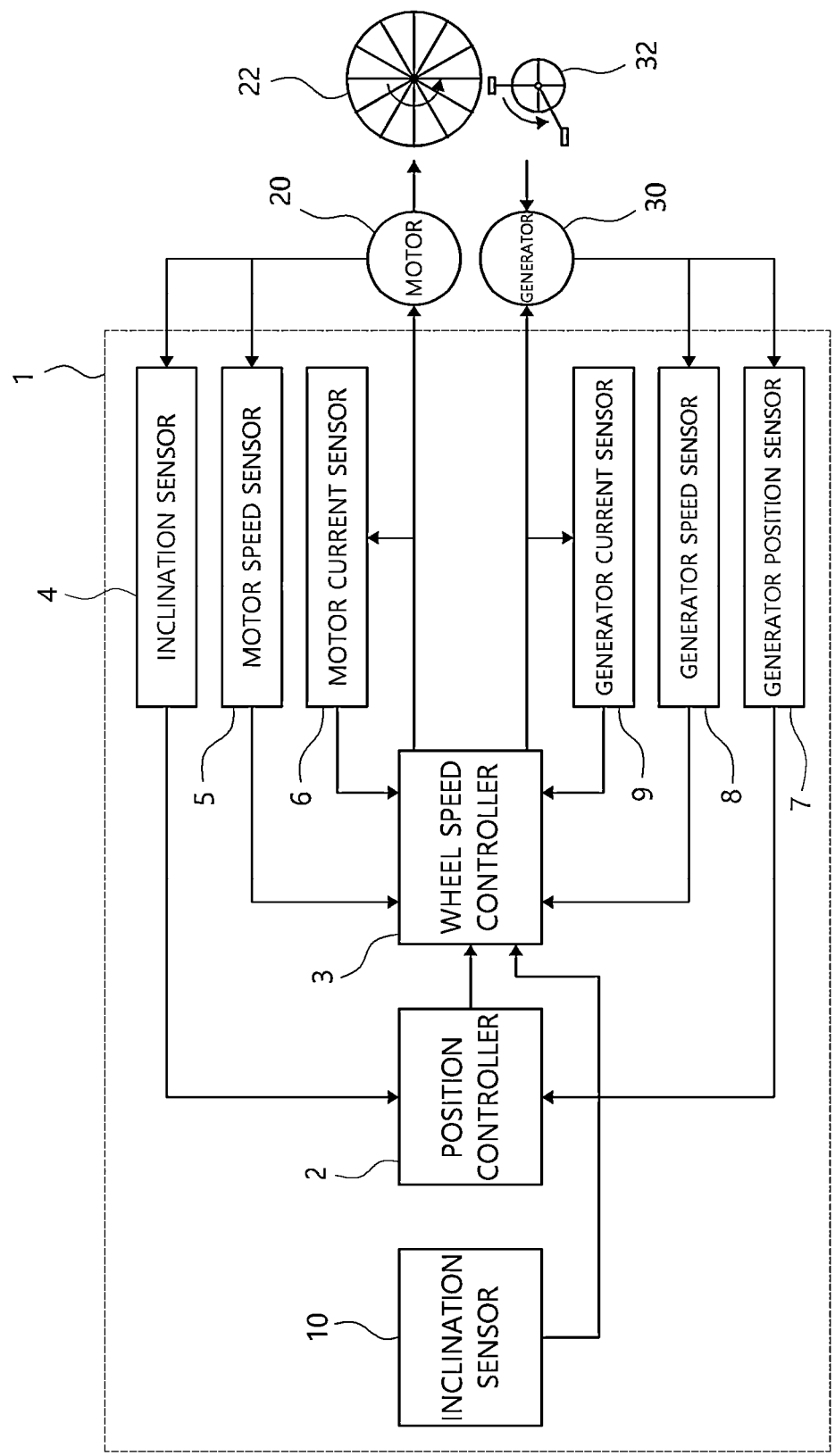
FIG. 1 illustrates a schematic structural diagram of an electric bicycle speed control device according to one exemplary embodiment of the present invention.

FIG. 1 illustrates a schematic structural diagram of an electric bicycle speed control device according to one exemplary embodiment of the present invention.

An electric bicycle speed control device 1 uses positional relationships and speeds of a pedal 32 and a driving wheel 22 to control a speed of an electric bicycle.

In a general bicycle using a chain, a pedal and a wheel are mechanically connected through the chain, and thus, the wheel rotates as much as the pedal rotates. However, an electric bicycle without a chain has no mechanical connection.

Accordingly, a positional relationship between a pedal and a wheel should be used in order to rotate the wheel as much as the pedal rotates.

A position controller 2 generates a speed command Nw* for the wheel 22 by a position Op of the pedal 32 measured by a generator position sensor 7 and a position Ow of the wheel 22 measured using a motor position sensor 4. By controlling the speed of the wheel 22 so that a difference between the position of the pedal 32 and the position of the wheel 22 is zero ($\theta p - \theta w = 0$), the position of the pedal 32 and the position of the wheel 22 are matched.

A wheel speed controller 3 generates a torque command Tw* for controlling the speed of the wheel 22 by a speed command for the wheel, an actual speed Nw of the wheel 22 measured using a motor speed sensor 5, and a speed Np of the pedal 32 measured using a generator speed sensor 8. In addition, a torque command Tp* for the pedal 32 is also generated to create a feeling of the pedal 32 like a bicycle with a chain, and an assist level is applied to the torque command for the pedal 32. In addition, the speed of the wheel 22 and the feeling of the pedal 32 may be adjusted according to an inclination measured using an inclination sensor 10.

Figure 2:
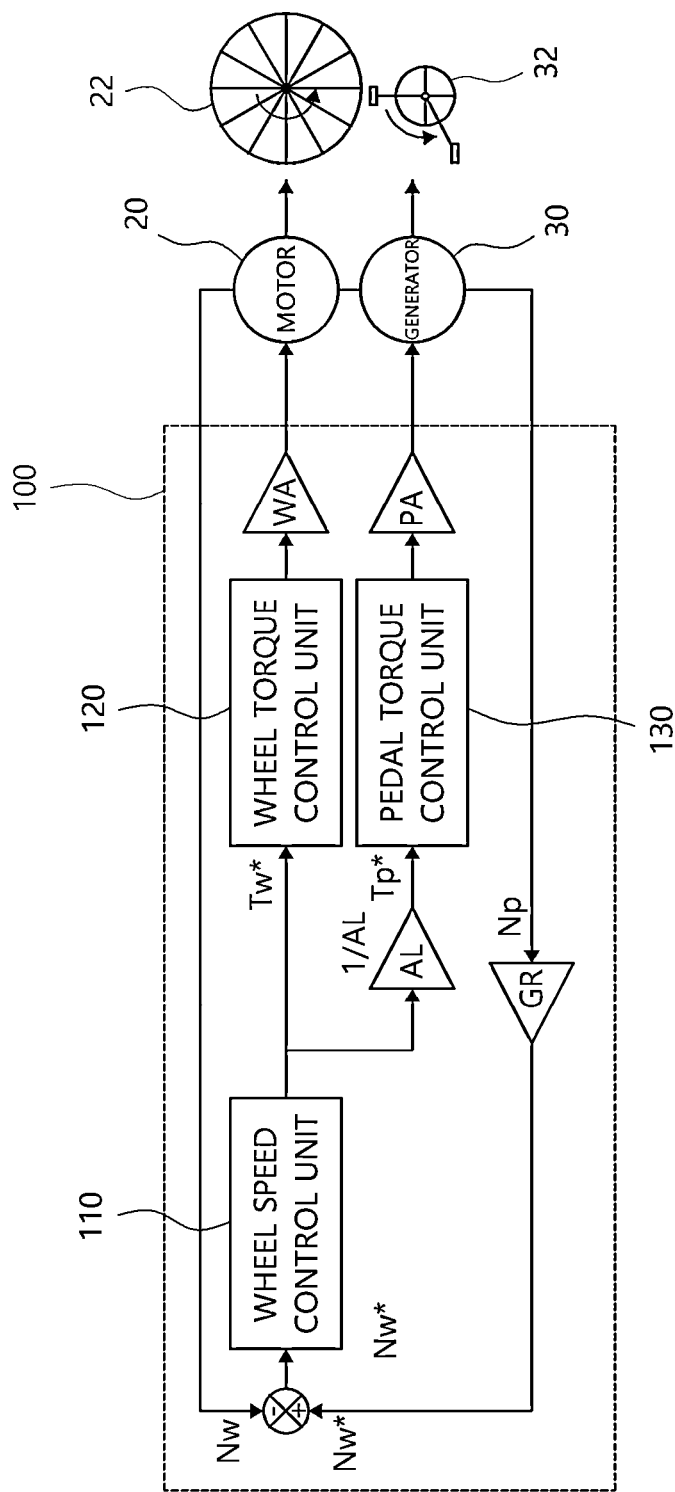
FIG. 2 is a schematic structural diagram of a wheel speed control part of the electric bicycle speed control device according to one exemplary embodiment of the present invention.

FIG. 2 is a schematic structural diagram of a wheel speed control device in the electric bicycle speed control device according to one exemplary embodiment of the present invention.

An electric bicycle speed control device 100 according to the present invention for controlling the wheel speed includes a wheel speed control unit 110, a wheel torque control unit 120, and a pedal torque control unit 130.

The wheel speed control unit 110 generates the wheel torque command Tw* and the pedal torque command Tp* using a wheel speed Nw and the wheel speed command Nw*. When a user steps on the pedal 32 and a generator 30 connected to the pedal 32 rotates, the pedal rotation speed Np is controlled to follow the wheel speed Nw.

The wheel speed command Nw* is generated by multiplying the pedal speed Np by a gear ratio (GR). In a bicycle with a chain, the pedal and the wheel are connected by the chain, and a rotation ratio between the pedal and the wheel is determined using the gear ratio. Accordingly, the gear ratio GR is applied to transmit the same pedal feeling to an electric bicycle without a chain.

When the wheel speed command Nw* is larger than the actually measured wheel speed Nw, the wheel speed control unit 110 increases the wheel torque command Tw* to increase the wheel speed Nw, and when the wheel speed command Nw* is smaller than the wheel speed Nw, the wheel speed control unit 110 decreases the wheel torque command Tw* to decrease the wheel speed Nw.

The wheel torque control unit 120 receives the wheel torque command Tw*, generates a current for driving the motor 20, and transmits the current to a wheel actuator WA to control the wheel speed.

The pedal torque control unit 130 receives the pedal torque command Tp*, generates a current for adjusting a load of the pedal 32, and transmits the current to a pedal actuator PA to adjust a load of the generator 30. The pedal torque command Tp* is determined by applying an assist level AL to the wheel speed command Tw*. As the assist level AL increases, the pedal becomes light, and thus, an equation of Tp*=Tw*/AL is applied.

Figure 3:
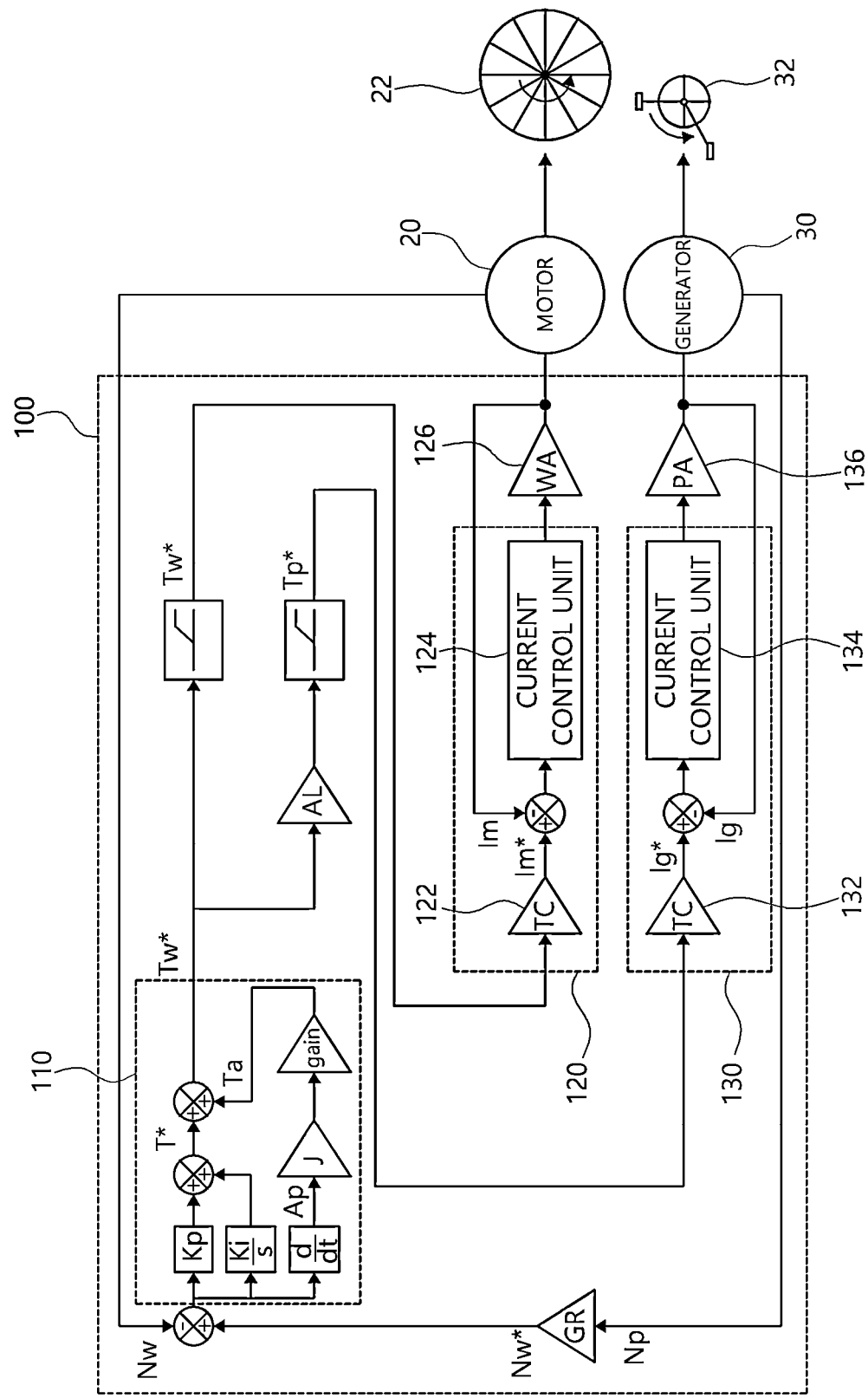
FIG. 3 is a more detailed structural diagram of the electric bicycle speed control device according to one exemplary embodiment of the present invention.

FIG. 3 is a more detailed structural diagram of each control unit according to the present invention.

The wheel speed control unit 110 may use a Proportional-Integral-Differential (PID) controller to generate the wheel torque command Tw*.

The wheel speed control unit 110 receives the wheel speed command Nw*, which is a value obtained by applying the gear ratio GR to the pedal speed Np measured by the generator 30, and the wheel speed Nw measured by the motor 20.

Torque T* is generated by applying a Proportional-Integral (PI) control to a difference Nw*-Nw between the wheel speed command Nw* and the wheel speed Nw as illustrated in the following equation.

$$T^* = Kp^*(N_w^* - N_w) + Ki\int(N_w^* - N_w)dt$$

Kp is a proportional gain value and Ki is an integral gain value.

The wheel torque command Tw* is generated by reflecting a forward compensation torque Ta by a wheel acceleration to the calculated torque T*.

The forward compensation torque Ta is generated by the following equation.

$$T_a - (N_w^* - N_w)d/dt * J^* \text{gain}$$

The forward compensation torque Ta is obtained by multiplying a value, which is obtained by differentiating the difference Nw*−Nw between the wheel speed command Nw* and the wheel speed Nw, by a wheel inertia J and the gain.

The wheel torque command Tw* is generated as Tw*=T*+Ta by adding the torque T* and the forward compensation torque Ta.

The wheel torque control unit 120 and the pedal torque control unit 130 drive the motor 20 according to the wheel torque command Tw* and the pedal torque command Tp* and generate a current for setting the load of the generator 30.

The wheel torque control unit 120 converts the wheel torque command Tw* into a motor current command Im* through a torque calculator (TC) 122. A current control unit 124 controls a current driving a wheel actuator (WA) 126 based on a difference between the motor current command Im* and an actually measured motor current Im. The motor 20 is driven by the WA 126, and the wheel 22 rotates to move the electric bicycle.

The pedal torque control unit 130 converts the pedal torque command Tp*, which is the value obtained by applying the assist level AL to the wheel torque command Tw*, into a generator current command Ig* through the torque calculator 132. The current control unit 134 controls a pedal actuator (PA) 136 for adjusting the load applied to the generator 30 by a difference between the generator current command Ig* and an actually measured generator current Ig. The PA 136 generates the load on the pedal 32 to generate a pedal feeling of the user stepping on the pedal.

By separating the wheel torque control unit 120 and the pedal torque control unit 130 in this way, even when the pedal torque control unit 130 or the PA 136 fails, the electric bicycle may be operated normally. When the PA 136 does not operate, the load applied to the pedal 32 is not generated, and thus, the user cannot feel the feeling of the pedal. However, the generator 30 is rotated by the rotation of the pedal 32, the wheel toque command Tw* for controlling the wheel speed is generated while the pedal speed Np which is the rotation speed of the generator is transmitted to the wheel speed control unit 110, and thus, the wheel torque control unit 120 may generate the current for driving the motor 20.

The wheel speed command Nw* and the wheel speed Nw are used to calculate power of the wheel 22 and power of the pedal 32.

A wheel angular speed Ww is calculated as $$W_w - \frac{N_w}{60} * 2\pi,$$

and a pedal angular speed Wp is calculated as $$W_P - \frac{N_w^*}{60} * 2\pi.$$

Therefore, rotational power is a product of the torque and the angular speed, and thus, wheel power Pw is $P_w - T_w^{}W_w$ and pedal power Pp is $P_p - T_p^{}W_p$.

When the calculated wheel power Pw is greater than 0, the wheel is driven, and when the pedal power Pp is less than 0, the feeling of the pedal is generated by reaction force.

Figure 4:
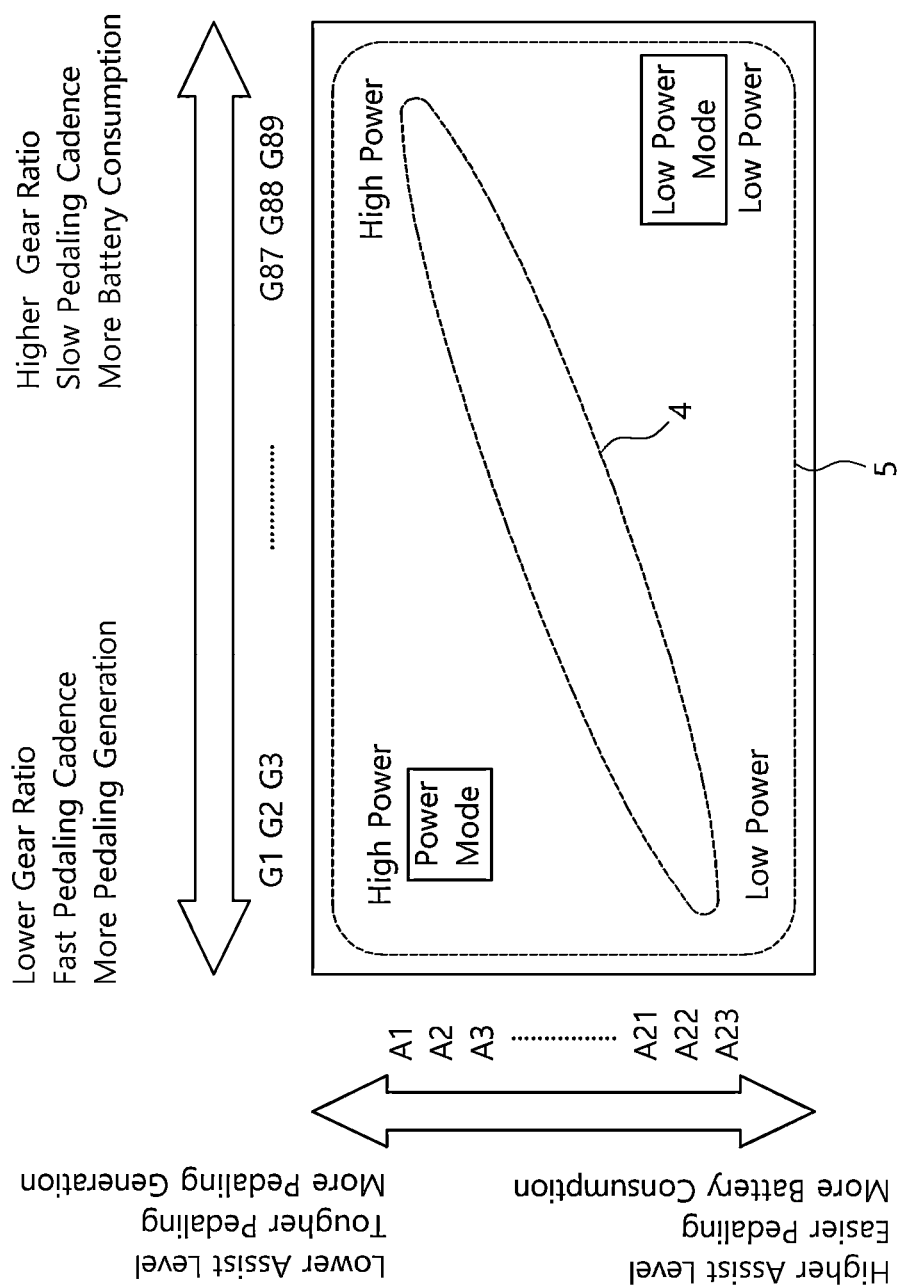
FIG. 4 illustrates a relationship between pedal power and a gear ratio by the electric bicycle speed control device according to one exemplary embodiment of the present invention.

FIG. 4 illustrates a relationship between pedal power and a gear ratio by the electric bicycle speed control device according to the present invention.

An X-axis represents a gear ratio and a Y-axis represents an assist level.

As the gear ratio increases in a direction toward a right side of the X-axis, a pedaling speed decreases, and thus, power generation decreases, and battery consumption increases. Conversely, the gear ratio decreases in a direction toward the left, and the pedaling becomes easier, and the power generation increases.

As the assist level increases in a direction toward a lower side of the Y-axis, the pedaling becomes easier, but battery consumption for assist increases. Conversely, as the assist level decreases in a direction toward an upper side, the pedaling becomes more difficult, and the power generation increases.

In a relationship 4 between a gear ratio and a pedal torque of a general bicycle with a chain, as the gear ratio increases, force applied to the pedal should be increased, and thus, the cadence of the pedal decreases. Instead, more power is transmitted to the wheel.

Conversely, as the gear ratio decreases, the force applied to the pedal decreases and the cadence of the pedal increases. The load applied to the pedal is small, and thus, the pedal may be rotated quickly. However, a small amount of power is transmitted to the wheel.

Since the pedal and the wheel are connected by a chain, it is impossible to increase the speed of the wheel while the force applied to the pedal is small or to decrease the speed of the wheel even when a large force is applied to the pedal. That is, the relationship between the gear ratio and the pedal torque cannot be out of a predetermined area 4.

On the other hand, according to the present invention for controlling the speed of the electric bicycle without a chain, it is possible to set a wider area 5 than that of the bicycle with a chain.

The assist level refers to the amount of power that assists the pedal power. When the assist level is large, a large amount of power is transmitted to the wheel compared to the force of the user pressing on the pedal, whereas, when the assist level is small, the power is transmitted to the wheel only as much as the force of the user pressing on the pedal.

When the gear ratio is low and the assist level is low, the power transmitted to the wheel is minimal, and thus, rapid rotation of the pedal is possible, and this torque may be used to charge the generator. That is, it is possible to set a power mode. When the gear ratio is low but the assist level is high, the power transmitted to the wheel increases, and thus a high speed may be obtained. In FIG. 4, a region indicated as the power mode corresponds to this case.

As the gear ratio increases, the force applied to the pedal increases. However, when the assist level is high, it is possible to apply less force to the pedal even when the gear ratio is high (low power mode). Moreover, the force transmitted to the wheel may be set the same as when applying large force to the pedal. In FIG. 4, a region set to the low power mode corresponds to this case.

As described above, in the present invention, according to the combination of the gear ratio and the assist level, it is possible to implement the region 4 in which a pedal feeling similar to that of a general chain bicycle may be formed and other power modes that cannot be implemented in a general chain bicycle.

Figure 5:
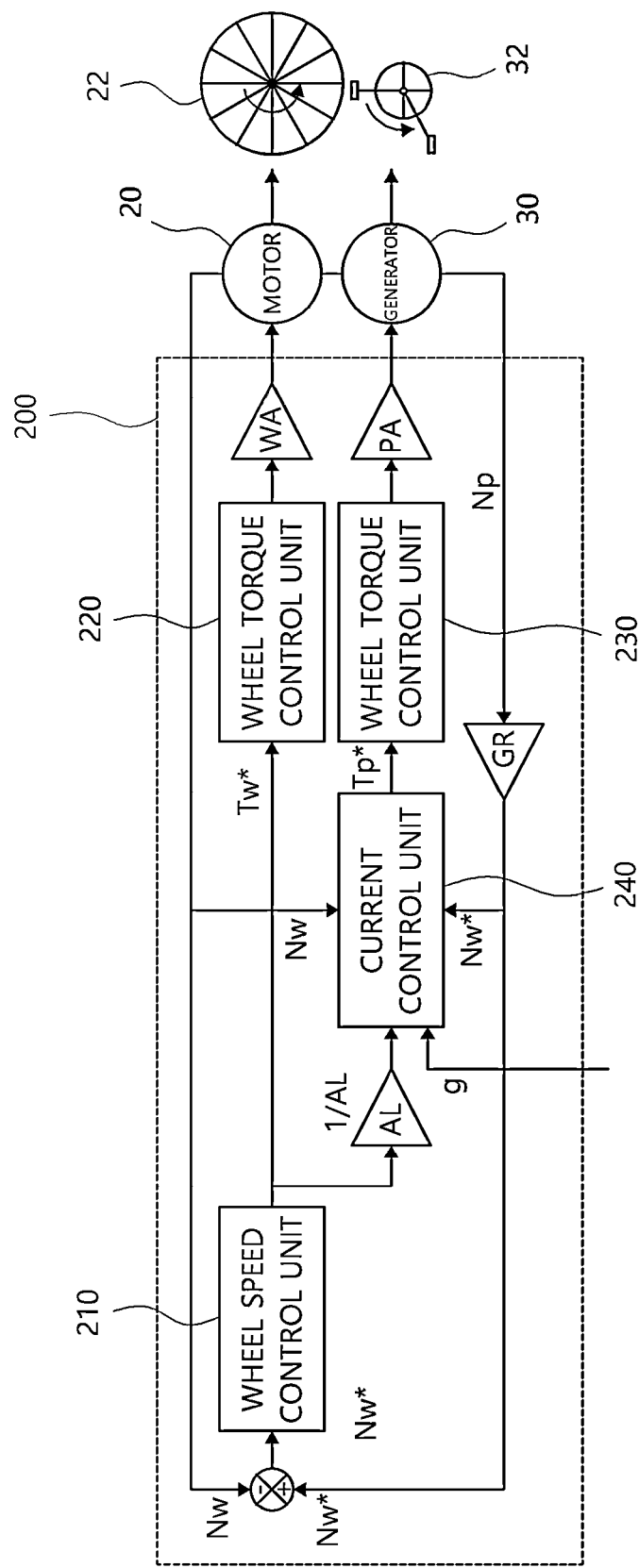
FIG. 5 is a structural diagram of an electric bicycle speed control device according to another exemplary embodiment of the present invention.

FIG. 5 is a structural diagram of an electric bicycle speed control device according to another exemplary embodiment of the present invention.

An electric bicycle speed control device 200 may further include a pedal feeling control unit 240 together with a wheel speed control unit 210, a wheel torque control unit 220, and a pedal torque control unit 230.

The pedal feeling control unit 240 generates the pedal torque command Tp* by additionally considering an inclination g.

For example, starting from a standstill or traveling on an inclined place requires additional control to adjust the feeding of the pedal.

On a plain where the inclination g is 0, as described above, the wheel torque command Tw* and the pedal torque command Tp* are generated by the difference between the wheel speed command Nw* and the wheel speed Nw.

In a case where the inclination g is 0 or more, that is, when going up a hill, an additional control is required for the pedal torque command Tp*. On hills, a situation where the wheel speed Nw is less than or equal to 0 may occur. In this case, since the pedal torque command Tp* is not generated, the user may feel as if the pedal is idle. Therefore, when the inclination g is greater than 0 and the wheel speed Nw is less than or equal to 0, a pedal torque command Tp* of a certain size is generated. The pedal torque generated in this way will allow the user to balance.

When the electric bicycle starts and the wheel speed Nw is greater than 0, the pedal torque command Tp* is generated by a difference between the wheel speed command Nw* and the wheel speed Nw as in the case of a plain.

Figure 6:
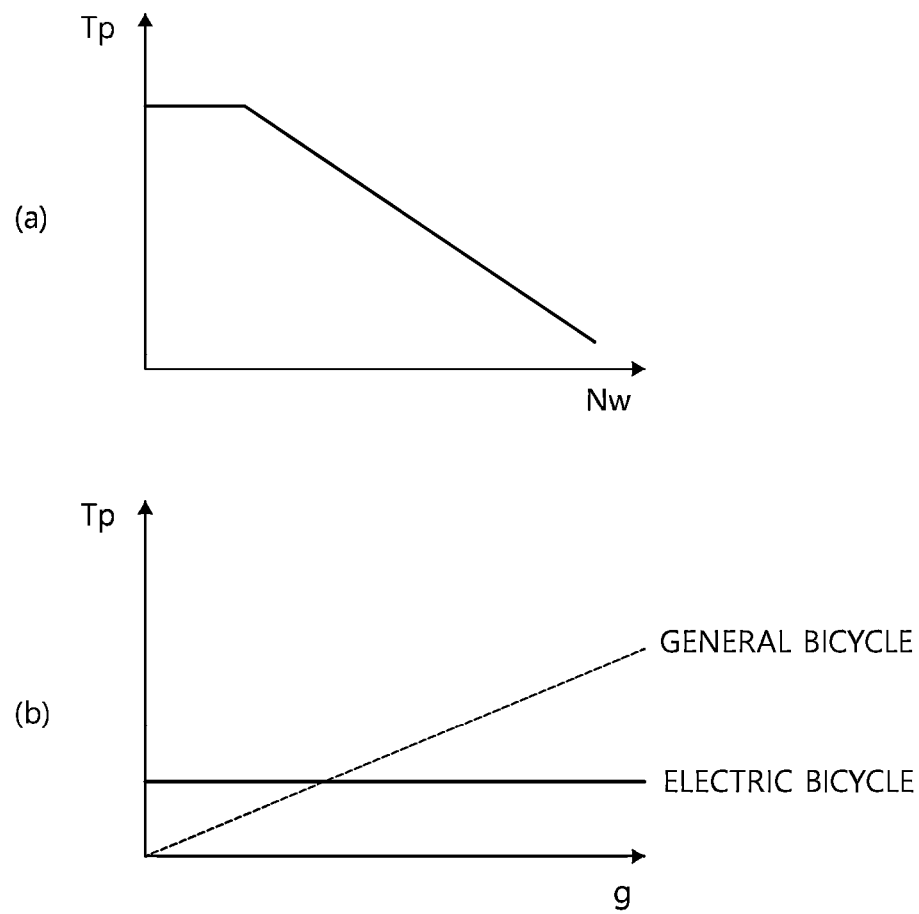
FIG. 6 illustrates effects of the electric bicycle speed control device according to another exemplary embodiment of the present invention.

FIG. 6 illustrates a relationship between the wheel speed and the pedal torque when the inclination is considered in this way.

FIG. 6A illustrates a magnitude of the pedal torque according to the wheel speed on a hill.

When the inclination g is greater than 0, the pedal torque Tp is maintained at a certain level until the wheel speed Nw reaches a certain speed in the stopped state, allowing the user to balance. When the wheel speed Nw exceeds a certain speed, the pedal torque Tp is reduced to maintain the feeling of the pedal.

FIG. 6B illustrates a relationship between the inclination and the force transmitted to the pedal.

In a general chain bicycle, as the inclination g increases, the force applied to the pedal should be increased. This is because the steeper the slope, the more difficult the pedaling becomes.

However, in the case of the electric bicycle according to the present invention, it is possible to always drive the pedal with the same force by adjusting the assist level. It is possible to drive the pedals with the same force whether on a plain (g=0) or on hills (g>0). Therefore, a user with weak leg strength, such as an elderly person, may conveniently use the bicycle.

Figure 7:
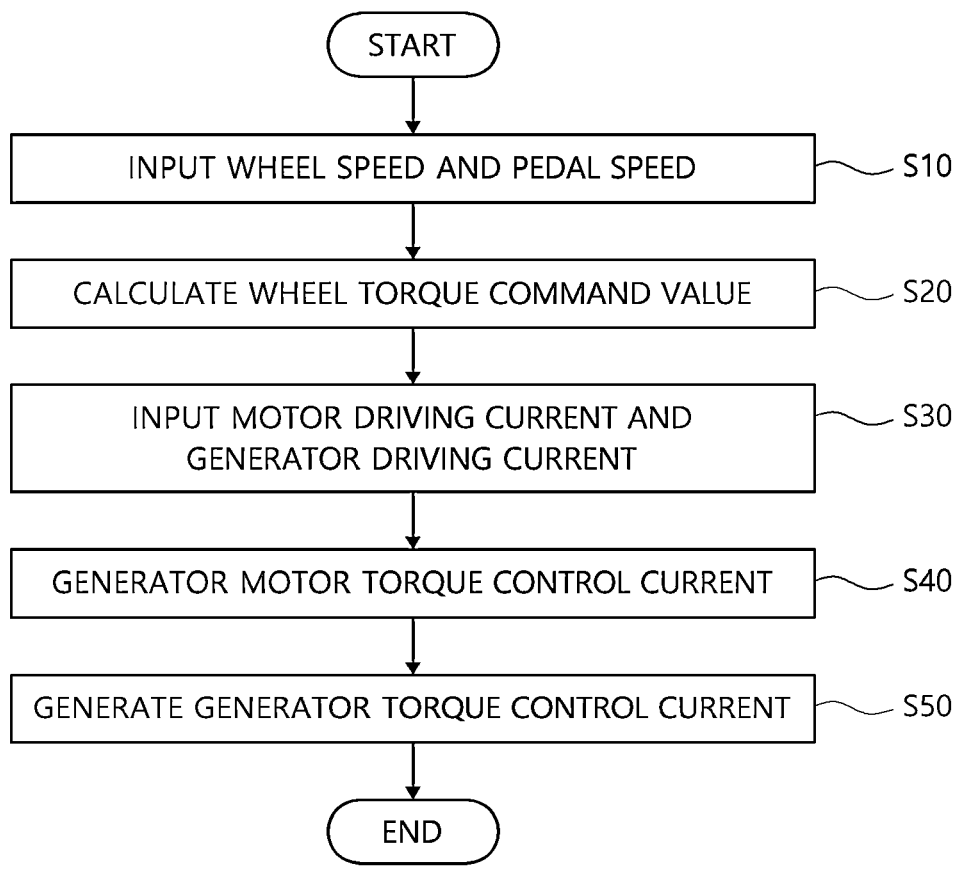
FIG. 7 is a schematic flowchart of an electric bicycle speed control method according to still another exemplary embodiment of the present invention.

FIG. 7 is a schematic flowchart of an electric bicycle speed control method according to still another exemplary embodiment of the present invention.

The electric bicycle speed control method may be performed by a control unit including one or more processors and a memory.

The control unit receives a wheel speed and a pedal speed from a wheel speed sensor and a pedal speed sensor (S10).

A wheel speed command is calculated by multiplying the received pedal speed by a gear ratio, and a wheel torque command value is calculated by a difference between the wheel speed command and an actual measured wheel speed (S20). This is to allow the wheel speed to be adjusted according to the pedal speed. That is, the wheel torque command value is calculated so that the wheel speed follows the speed of the pedal.

In order to generate a motor driving current and a pedal torque current according to the wheel torque command value, measured values of the motor driving current and a generator driving current are input from the sensor (S30).

The motor driving current command value for driving the motor is calculated by the wheel torque command value, and the motor torque current is controlled by the difference between the motor driving current command value and the actual measured motor driving current (S40). The motor torque current is controlled so that the actual measured motor driving current follows the motor driving current command value.

The value obtained by applying the assist level to the wheel torque command value is calculated as the generator torque control current command value, and the generator torque control current is controlled so that the actual measured generator driving current value follows the generator torque control current command value (S50).

According to the electric bicycle speed control device and method, the wheel speed is controlled to follow the pedal speed according to the pedal speed and the feeling of the pedal is controlled. Accordingly, the user may feel the feeling of the pedal like that of the chain bicycle, and by controlling the force applied to the pedal differently for each user, men and women of all ages may conveniently use the electric bicycle.

The scope of protection of the present invention is not limited to the description and expression of the embodiments explicitly described above. In addition, it is added once again that the scope of protection of the present invention may not be limited due to obvious changes or substitutions in the technical field to which the present invention pertains.

What is claimed is:

1. An electric bicycle speed control device comprising:
   a speed sensor unit configured to measure a rotation speed of a wheel and a rotation speed of a generator driven by a pedal;
   a current sensor unit configured to measure driving currents of a motor for driving the wheel and the generator;
   a wheel speed control unit configured to generate a wheel torque command value using a wheel speed command value obtained by multiplying a rotation speed of the pedal measured by the speed sensor unit by a gear ratio and a wheel speed value measured by the speed sensor unit;
   a wheel torque control unit configured to generate a motor driving control current for driving the motor using the wheel torque command value and a driving current value of the motor measured by the current sensor unit; and
   a pedal torque control unit configured to generate a generator torque control current for controlling a torque of the generator using a value obtained by applying an assist level to the wheel torque command value and a generator driving current measurement value measured by the current sensor unit.

2. The electric bicycle speed control device of claim 1, wherein the wheel speed control unit controls the wheel torque command value so that the wheel speed value follows the wheel speed command value.

3. The electric bicycle speed control device of claim 1, wherein the wheel speed control unit generates the wheel torque command value by a Proportional-Integral-Differential (PID) control method.

4. The electric bicycle speed control device of claim 3, wherein the wheel speed control unit generates the wheel torque command value by adding:
   a value obtained by multiplying a value obtained by subtracting a wheel speed from the wheel speed command value by a proportional coefficient;
   a value obtained by integrating a value obtained by subtracting the wheel speed from the wheel speed command value; and
   a value obtained by differentiating a value obtained by subtracting the wheel speed from the wheel speed command value and then multiplying the differential value by a wheel inertia value.

5. The electric bicycle speed control device of claim 1, wherein the wheel torque control unit includes:
   a wheel torque calculation unit; and
   a wheel current control unit,
   wherein the wheel torque calculation unit calculates a motor current command for driving the motor using the wheel torque command, and
   the wheel current control unit controls a current for driving the motor using the motor current command and the measured motor driving current value.

6. The electric bicycle speed control device of claim 5, wherein the wheel torque control unit controls the motor driving current so that the motor driving current value follows the motor current command.

7. The electric bicycle speed control device of claim 1, wherein the pedal torque control unit includes:
   a pedal torque calculation unit; and
   a pedal current control unit,
   wherein the pedal torque calculation unit calculates a generator current command using the value obtained by applying the assist level to the wheel torque command value, and
   the pedal current control unit generates the generator torque control current using the generator current command and a measured generator current value.

8. The electric bicycle speed control device of claim 7, wherein the pedal torque control unit controls the generator torque control current so that the generator current value follows the generator current command.

9. An electric bicycle speed control method executed by a control unit including one or more processors, the method comprising:
   receiving a rotation speed of a pedal and a wheel speed;
   generating a wheel torque command value using a wheel speed command value obtained by multiplying the rotation speed of the pedal by a gear ratio and a measured wheel speed value;
   measuring a driving current of a motor for driving a wheel and a driving current of a generator driven by the pedal;
   generating a motor driving control current for driving the motor using the wheel torque command value and a measured motor driving current value; and
   generating a generator torque control current for controlling a torque of the generator using a value obtained by applying an assist level to the wheel torque command value and a measured generator driving current value.

10. The electric bicycle speed control method of claim 9, wherein the generating of the wheel torque command value includes controlling the wheel torque command value so that a measured wheel speed value follows the wheel speed command value.

* * * * *